United States Patent Office 3,595,861
Patented July 27, 1971

3,595,861
NOVEL SYNTHESIS OF 2-QUINAZOLINE-
PROPIONIC ACIDS AND DERIVATIVES
Stanley C. Bell, Penn Valley, and Peter H. L. Wei, Upper
Darby, Pa., assignors to American Home Products
Corporation, New York, N.Y.
No Drawing. Filed Dec. 8, 1967, Ser. No. 689,009
Int. Cl. C07d 51/48
U.S. Cl. 260—251                                    16 Claims

ABSTRACT OF THE DISCLOSURE

This invention is concerned with 2-quinazolinepropionic acids, and derivatives thereof, which are pharmacologically efficacious as tranquilizing agents. Further, it relates to 5-hydroxytetrahydropyrroloquinazolinones which are useful intermediates in the preparation of these 2-quinazolinepropionic acids. Still further, it relates to a process for the preparation of these 2-quinazolinepropionic acids and esters. The reaction is effected by contacting an appropriate 2'-carbonyl-3-halopropionanilide (I) with an alkali metal cyanide (II), e.g., sodium and potassium cyanide, and a reactant (III) selected from the group consisting of water, an alkanol and a glycol at a temperature range from about 50° C. to about reflux temperatures for a period of about ten to about twenty-four hours.

---

This invention relates to new and novel quinazoline compounds. In particular, it concerns 5-hydroxytetrahydropyrroloquinazolinones which are useful intermediates in the preparation of 2-quinazolinepropionic acids. Further, it relates to 2-quinazolinepropionic acids, esters, amides and hydrazides which are pharmacodynamically active as tranquilizers.

The new and novel compounds within the scope of the present invention are exemplified by the following formulae:

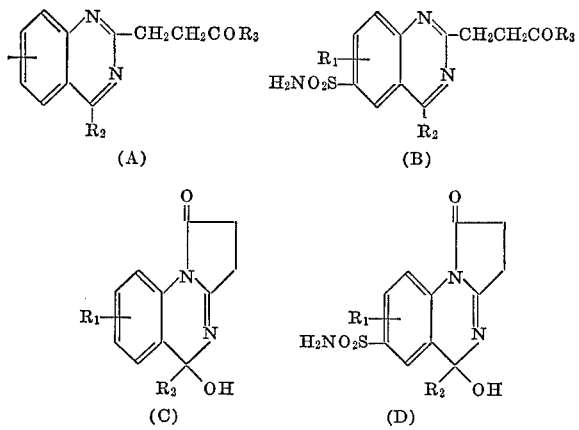

wherein $R_1$ is selected from the group consisting of hydrogen, halogen, lower alkyl and lower alkoxy; $R_2$ is selected from the group consisting of lower alkyl, phenyl, halophenyl, lower alkylphenyl, lower alkoxyphenyl, sulfamoylphenyl and sulfamoylhalophenyl; and $R_3$ is selected from the group consisting of hydroxy, lower alkoxy, hydroxy(lower)alkoxy, lower alkanoylamino(lower)alkylamino, amino(lower)alkylamino, lower alkylamino (lower)alkylamino, di(lower)alkylamino(lower)alkylamino, amino, lower alkylamino, di(lower)alkylamino, phen(lower)alkylamino and hydrazino. As employed herein, the terms "lower alkyl," "lower alkoxy" and "lower alkanoyl" are meant to include both branched and straight chain moieties having from about one to about eight carbon atoms. The compounds of the present invention which are depicted by structural Formula A and B are 2-quinazolinepropionic acids and derivatives thereof while those compounds which are represented by Formulae C and D are hydroxytetrahydropyrroloquinazolinones. Typical examples thereof are: 6-chloro-4-phenyl-2-quinazolinepropionic acid; 4-methyl-2-quinazolinepropionic acid, ethyl ester; 6-chloro-4-phenyl-2-quinazolinepropionic acid, 2-hydroxyethyl ester; 6-chloro-4-phenyl-2-quinazolinepropionic acid, hydrazide; 7-chloro-4-phenyl-6-sulfamoyl-2-quinazolinepropionic acid; 6-chloro-N-[2-(diethylamino) ethyl]-4-phenyl-2-quinazolinepropionamide; and 7-chloro-5-hydroxy-5 - phenyl - 1,2,3,5 - tetrahydropyrrolo[1,2-a] quinazolin-1-one.

The 2-quinazolinepropionic acids, the esters thereof and the 5-hydroxytetrapyrroloquinazolinones of this invention may be prepared by the new and novel process which is herein schematically illustrated:

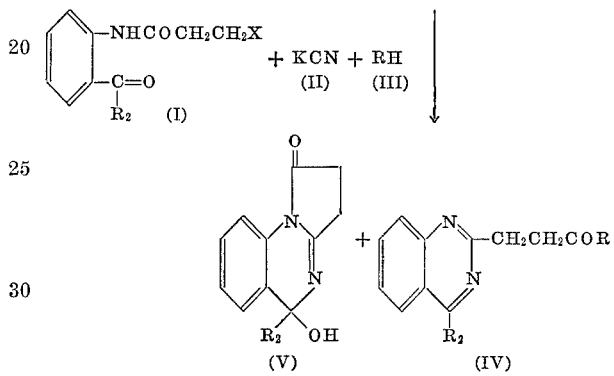

wherein $R_2$ is defined as above, X is halogen, R is selected from the group consisting of hydroxy, lower alkoxy and hydroxy (lower) alkoxy; and the unsubstituted benzo ring of compounds (I), (IV) and (V) can be substituted as depicted by the corresponding ring exemplified in Formulae A, B, C and D.

The reaction is effected by contacting an appropriate 2'-carbonyl-3-halopropionanilide (I) with an alkali metal cyanide (II), e.g., sodium and potassium cyanide, and a reactant (III) selected from the group consisting of water, an alkanol and a glycol at a temperature range from about 50° C. to about reflux temperatures for a period of about ten to about twenty-four hours. Preferably, this reaction is conducted with potassium cyanide at reflux temperatures for about sixteen hours.

When the reaction is complete, the reaction mixture is cooled and filtered. The collected solid contains the 5-hydroxytetrahydropyrroloquinazolinone (V) and the filtrate contains the 2-quinazolinepropionic acid type compound (IV). These compounds (IV) (V) may be purified by standard procedures. For example, the collected solid may be washed with water to remove potassium chloride and the residue recrystallized from a suitable solvent, e.g., dimethoxyethane, to afford a 5-hydroxytetrahydropyrroloquinazolinone (V). Further, the above filtrate may be concentrated, the residue treated with an alkanol and then recrystallized from an appropriate solvent, e.g., an alkanol to yield a 2-quinazolinepropionic acid type compound (IV).

In the above reaction, when reactant (III) is water, the product (IV) is in the form of the free carboxylic acid. Alternatively, when reactant (III) is an alkanol or a glycol the product (IV) is the respective carboxylic acid ester and the carboxylic acid hydroxyester. The above prepared 5 - hydroxytetrahydropyrroloquinazolinones (V) may be converted to their corresponding 2-quinazolinepropionic acids by contact with a dilute mineral acid, e.g., hydrochloric acid or a base, e.g., sodium hydroxide at about steam bath temperatures until solution is complete. Thereafter, the reaction mixture is cooled and acidified to precipitate the resulting 2-quinazolinepropionic acid.

The 2-quinazolinepropionic acids of the present invention may also be prepared by the alkaline hydrolysis of the corresponding ester. For example, an appropriate 2-quinazolinepropionic acid ester is admixed with an aqueous alkali metal hydroxide solution at about steam bath temperatures until hydrolysis is complete. Thereafter, the reaction mixture is acidified by the addition of a mineral acid and the resulting 2-quinazolinepropionic acid separated by conventional recovery procedures.

The new and novel 2-quinazolinepropionic acid hydrazides and 2-quinazolinepropionamides of the present invention may be prepared by standard procedures. For example, an appropriate 2-quinazolinepropionic acid ester is contacted with a hydrazine or an amine at a temperature range from about steam bath temperatures to about reflux temperatures for a period of about one to about twenty hours. When the reaction is complete, the resulting 2 - quinazolinepropionic acid, hydrazide or 2 - quinazoline propionamide is separated by routine means, e.g., filtration and recrystallization of the collected solid from a suitable solvent, e.g., an alkanol.

The 2'-carbonyl - 3 - halopropionanilide (I) starting compounds are prepared by routine chemical processes which are hereinafter exemplified in Examples I and II. The new and novel 5-hydroxytetrahydropyrroloquinazolinones (V) of the present invention are useful as intermediates in the preparation of the 2-quinazolinepropionic acids of this invention. The new and novel 2-quinazolinepropionic acids, esters, amides and hydrazides of the present invention have been found to possess interesting pharmaceutical properties which render them useful as synthetic medicinals. More particularly, these compounds, in standard pharmacological tests, for example, the procedure described by Holten, C. H., in Acta pharmacol. et toxicol. 13, 113 (1957), have exhibited utility as tranquilizing agents useful as sedative depressants.

When the 2-quinazolinepropionic acids, esters, amides and hydrazides of this invention are employed as tranquilizing agents in warm-blooded animals they may be administered alone or in combination with pharmaceutically acceptable carriers, the proportion of which is determined by the solubility and chemical nature of the compound, chosen route of administration and standard pharmaceutical practice. For example, they may be administered orally in the form of tablets or capsules containing such excipients as starch, milk sugar, certain types of clay, and so forth. They may also be administered orally in the form of solutions which may contain coloring and flavoring agents or they may be injected parenterally. For parenteral administration they may be used in the form of a sterile solution containing other solutes, for example, enough saline or glucose to make the solution isotonic.

The dosage of the present therapeutic agents will vary with the form of administration and the particular compound chosen. Furthermore, it will vary with the particular subject under treatment. Generally, treatment is initiated with small dosages substantially less than the optimum dose of the compound. Thereafter, the dosage is increased by small increments until the optimum effect under the circumstances is reached. In general, the compounds of this invention are most desirably administered at a concentration level that will generally afford effective results without causing any harmful or deleterious side effects and preferably at a level that is in the range of from about 2 mg. to about 20 mg. per kilo per day, although as aforementioned variations will occur. However, a dosage level that is in the range of from about 6 mg. to about 12 mg. per kilo per day is most desirably employed in order to achieve effective results.

The following examples are given by way of illustration and are not to be construed as limitations of this invention, many variations of which are possible without departing from the scope and spirit thereof.

EXAMPLE I o-Aminoacetophenone (.261 m.) is dissolved in 500 ml. of chloroform and triethylamine (26 g.) is added. With cooling and stirring β-chloropropionyl chloride (36.5 g. or .287 m.) is slowly added and more triethylamine (15 g.) is added. The solution is stirred for one hour, and then washed with water. The organic solution is dried over anhydrous magnesium sulfate. After chloroform is removed in vacuo a solid is obtained, which is recrystallized from ethanol to afford 2'-acetyl-3-chloropropionanilide (36.5 g., 75% yield), M.P. 92–94° C.

Calcd. for $C_{11}H_{12}ClNO_2$ (percent): C, 58.65; H, 5.37; Cl, 15.77; N, 6.22. Found (percent): C, 58.74; H, 5.72; Cl, 15.30; N, 5.92.

EXAMPLE II

To a solution of 231 g. (1.0 m.) of 2-amino-5-chlorobenzophenone in 1:1 liters of chloroform 144 g. (1.1 m.) of β-chloropropionylchloride is slowly added. The mixture is stirred at room temperature for two hours. After the solvent is removed in vacuo the residue is dissolved in 400 ml. of ethanol. Upon cooling the crystallized solids which separate are collected (242 g.). By concentrating the mother liquor 26 g. is recovered. The crude material is recrystallized from cyclohexane to afford 2'-benzoyl-3,4'-dichloropropionanilide, M.P. 75–6° C.

Calcd. for $C_{16}H_{13}Cl_2NO_2$ (percent): C, 59.60; H, 4.07; Cl, 22.02; N, 4.35. Found (percent): C, 59.41; H, 3.89; Cl, 21.90; N, 4.08.

EXAMPLE III

To 129 g. (0.40 m.) of 2'-benzoyl-3,4'-dichloropropionanilide in one liter of ethanol, there is added a solution of 31.2 g. (0.48 m.) of potassium cyanide in 50 ml. of water. The solution is heated to reflux overnight (18 hours). The insoluble material is filtered, and the filtrate concentrated and the residue treated with a small amount of ethanol to give 62 g. (yield 45.6%) of crude product, which is recrystallized from ethanol to yield 6-chloro-4-phenyl-2-quinazolinepropionic acid, ethyl ester, M.P. 72–3° C.

Calcd. for $C_{19}H_{17}ClN_2O_2$ (percent): C, 66.90; H, 5.02; Cl, 10.40; N, 8.22. Found (percent): C, 66.48; H, 4.98; Cl, 10.40; N, 8.11.

In a similar manner, 6-bromo-4(3-sulfamoylphenyl)-2-quinazolinepropionic acid, propyl ester and 7-fluoro-4-phenyl-2-quinazolinepropionic acid, ethyl ester are synthesized.

EXAMPLE IV

To 32.2 g. (.10 m.) of 2'-benzoyl-3,4'-dichloropropionanilide in 200 ml. of methanol, there is added 7.8 g. (.12 m.) of potassium cyanide in 10 ml. of water. The solution is heated to reflux overnight. The insoluble material is filtered off and the filtrate upon cooling yields 16 g. of crude material. This is recrystallized from methanol to give 13 g. of 6-chloro-4-phenyl-2-quinazolinepropionic acid, methyl ester (40% yield), M.P. 118–120° C.

Calcd. for $C_{18}H_{15}ClN_2O_2$ (percent): C, 66.15; H, 4.63; Cl, 10.85; N, 8.57. Found (percent): C, 66.27; H, 4.65; Cl, 10.8; N, 8.67.

In like manner, 2'-benzoyl-3-chloro-5'-iodopropionanilide is reacted with sodium cyanide in methanol to afford 1 - iodo - 4 - phenyl-2-quinazolinepropionic acid, methyl ester.

EXAMPLE V

2'-o-chlorobenzoyl-3,4'-dichloropropionanilide (35.0 g., .10 m.) and potassium cyanide (7.8 g., .12 m.) is heated to reflux in 300 ml. of 95% ethanol overnight. The insoluble material (KCl) is removed by filtration and the filtrate concentrated to give a yellow oil. The oil is treated with n-hexane. From the hexane solution there is obtained 23.4 g. (62.5% yield) of 6-chloro-4-(o-chlorophenyl)-2-quinazolinepropionic acid, ethyl ester, M.P. 65–66° C.

Calcd. for $C_{19}H_{16}Cl_2N_2O_2$ (percent): C, 60.75; H, 4.29; Cl, 18.95; N, 7.47. Found (percent): C, 60.77; H, 4.24; Cl, 18.80; N, 7.55.

EXAMPLE VI

Repeating the procedure of Examples III to V to react an appropriate 2'-carbonyl-3-halopropionanilide with an alkali metal cyanide and an alkanol, the following compounds are prepared:

4-(4-bromophenyl)-7-methyl-2-quinazolinepropionic acid, methyl ester;
6-ethyl-4-phenyl-2-quinazolinepropionic acid, ethyl ester;
4-(3-methoxyphenyl)-2-quinazolinepropionic acid, propyl ester;
4-(4-tolyl)-2-quinazolinepropionic acid, butyl ester; and
6-chloro-4-(4-ethylphenyl)-2-quinazolinepropionic acid, methyl ester.

EXAMPLE VII

A solution of 32 g. (.10 m.) of 2'-benzoyl-3,4'-dichloropropionanilide, 7.8 g. (.11 m.) of potassium cyanide and 40 ml. of ethylene glycol in 200 ml. of dimethoxyethane is heated to reflux overnight. The solid is filtered off and the filtrate concentrated in vacuo. The residue is dissolved in benzene and the benzene solution is washed with water, and then dried over anhydrous magnesium sulfate. Partial concentration of the benzene solution yields 9.0 g. (yield 25%) of product, which is further recrystallized from cyclohexane to afford 6-chloro-4-phenyl-2-quinazolinepropionic acid, 2-hydroxyethyl ester, M.P. 80–2° C.

Calcd. for $C_{19}H_{17}ClN_2O_3$ (percent): C, 63.96; H, 4.80; Cl, 9.94; N, 7.85. Found (percent): C, 63.96; H, 4.67; Cl, 9.84; N, 7.72.

Similarly, 2'-benzoyl-3-bromo-4'-methylpropionanilide is reacted with sodium cyanide and propylene glycol to afford 6-methyl-4-phenyl-2-quinazolinepropionic acid, 3-hydroxypropyl ester.

EXAMPLE VIII

A solution of 48.3 g. (.15 m.) of 2'-benzoyl-3,4'-dichloropropionanilide and 11.7 g. (.18 m.) of potassium cyanide in 300 ml. of dimethoxyethane containing 25 ml. of water is heated to reflux for nine hours. The mixture is allowed to stand at room temperature overnight. The solid is collected, dissolved in water, and upon acidification affords 6-chloro-4-phenyl-2-quinazolinepropionic acid, M.P. 163–165° C.

Calcd. for $C_{17}H_{13}ClN_2O_2$ (percent): C, 65.20; H, 4.18; Cl, 11.35; N, 8.95. Found (percent): C, 64.89; H, 3.95; Cl, 11.30; N, 9.22.

Repeating the above procedure, 2'-benzoyl-3-chloropropionanilide is converted to 4-phenyl-2-quinazolinepropionic acid, M.P. 164–166° C.

Calcd. for $C_{17}H_{14}N_2O_2$ (percent): C, 73.36; H, 5.07; N, 10.07. Found (percent): C, 72.90; H, 4.99; N, 10.13.

EXAMPLE IX

The above prepared 6-chloro-4-phenyl-2-quinazolinepropionic acid, ethyl ester (13 g.) is suspended in 200 ml. of a 10% sodium hydroxide solution and the suspension is heated on a steam bath until solution is complete. After a small amount of insoluble material is removed by filtration the solution is acidified with a dilute hydrochloric acid. The acid is collected, washed with water and dried at room temperature. The crude material is recrystallized from benzene to afford 8.0 g. of 6-chloro-4-phenyl-2-quinazolinepropionic acid, M.P. 163–165° C.

EXAMPLE X

Repeating the process of Example VIII, employing appropriate starting compounds, the following products are obtained:

6-methoxy-4-phenyl-2-quinazolinepropionic acid;
5-chloro-4-methyl-2-quinazolinepropionic acid;
7-methyl-4-(4-propoxyphenyl)-2-quinazolineproponic acid;
4-(4-fluorophenyl)-2-quinazolinepropionic acid; and
6-bromo-4-pentyl-2-quinazolinepropionic acid.

EXAMPLE XI 6-chloro-4-(2-chlorophenyl) - 2 - quinazolinepropionic acid, ethyl ester (15 g. or .04 m.) is suspended in 270 ml. of a 10% sodium hydroxide solution and the suspension heated on a steam bath until the solution is complete. A small amount of insoluble material is filtered off and the sodium salt which separates upon cooling is collected. The salt is again dissolved in hot water and the acid separated out upon acidification with glacial acetic acid. The crude acid is collected and recrystallized first from dimethoxyethane and then from benzene to afford 9.5 g. of 6-chloro-4-(2-chlorophenyl) - 2 - quinazolinepropionic acid, M.P. 156–158° C.

Calcd. for $C_{17}H_{12}Cl_2N_2O_2$ (percent): C, 58.80; H, 3.49; Cl, 20.42; N, 8.07. Found (percent): C, 58.70; H, 3.37; Cl, 20.0; N, 7.86.

EXAMPLE XII 6-chloro - 4 - phenyl-2-quinazolinepropionic acid, ethyl ester (3.0 g., .00882 m.) is suspended in 10 ml. of hydrazine hydrate and the mixture heated on a steam bath for two hours. Thereafter, 20 ml. of ethanol is added and solid separates upon cooling. The crude material is recrystallized from ethanol to afford 2.0 g. of 6-chloro-4-phenyl-2-quinazolinepropionic acid, hydrazide, M.P. 193–195° C.

Calcd. for $C_{17}H_{15}ClN_4O$ (percent): C, 62.46; H, 4.62; Cl, 10.85; N, 17.14. Found (percent): C, 62.31; H, 4.55; Cl, 11.0; N, 16.83.

EXAMPLE XIII 6-chloro - 4 - phenyl-2-quinazolinepropionic acid, ethyl ester (4.0 g., 0.1175 m.) is dissolved in 10 ml. of benzylamine, the solution heated on a steam bath for seventy-two hours and then refluxed for six hours. Excess amine is removed in vacuo, the residue treated with petroleum ether and the solid collected. The crude material is recrystallized from ethanol to yield N-benzyl-6-chloro-4-phenyl-2-quinazolinepropionamide (3.2 g., yield 68%), M.P. 164–166° C.

Calcd. for $C_{24}H_{20}ClN_3O$ (percent): C, 71.73; H, 5.02; Cl, 8.82; N, 10.46. Found (percent): C, 71.82; H, 4.72; Cl, 8.8; N, 10.55.

Similarly, 7-methoxy-N-phenethyl-4-(4-tolyl)-2-quinazolinepropionamide and N-phenbutyl-4-phenyl-2-quinazolinepropionamide are prepared.

EXAMPLE XIV 6-chloro - 4 - phenyl-2-quinazolinepropionic acid, ethyl ester (4.0 g., .01175 m.) is dissolved in 15 ml. of 2,2-diethylethylenediamine, the solution heated on a steam bath overnight and then refluxed for six hours. The excess amine is removed in vacuo, the residue treated with hot petroleum ether, the solid collected and recrystallized from cyclohexane to yield 2.40 g. of 6-chloro-N-[(2-diethylamino)ethyl] - 4-phenyl-2-quinazolinepropionamide, (50% yield).

Calcd. for $C_{23}H_{27}ClN_4O$ (percent): C, 67.23; H, 6.63; Cl, 8.63; N, 13.63. Found (percent): C, 67.18; H, 6.70; Cl, 8.60; N, 13.66.

EXAMPLE XV 6-chloro-4-phenyl-2-quinazolinepropionic acid, methyl ester (5.0 g.) is dissolved in an alcoholic 30% methylamine solution and heated to reflux for six hours. The solution is allowed to stand at room temperature overnight. Thereafter, solvents are removed and the residue recrystallized from ethanol to yield 1.5 g. of 6-chloro-N-methyl-4-phenyl-2-quinazolinepropionamide, M.P. 155–157° C.

Calcd. for $C_{18}H_{16}ClN_3O$ (percent): C, 66.30; H, 4.94; Cl, 10.90; N, 12.92. Found (percent): C, 65.98; H, 5.02; Cl, 11.05; N, 12.70.

EXAMPLE XVI 6-chloro - 4 - phenyl-2-quinazolinepropionic acid, ethyl ester, (7.00 g., .0206 m.) is dissolved in 15 ml. of ethylene diamine and the solution heated to reflux overnight. The excess amine is removed in vacuo and the residue treated with a small amount of benzene. The crude material is recrystallized from benzene to afford 2.5 g. of N-(2 - aminoethyl)-6-chloro-4-phenyl-2-quinazolinepropionamide, M.P. 115–117° C. (yield 34.3%).

Calcd. for $C_{19}H_{19}ClN_4O$ (percent): C, 64.31; H, 5.40; Cl, 10.00; N, 15.79. Found (percent): C, 64.35; H, 5.40; Cl, 9.8; N, 15.47.

EXAMPLE XVII 6-chloro-4-phenyl-2-quinazolinepropionic acid, ethyl ester (3.00 g.) is dissolved in 10 ml. of n-butylamine and the solution heated on a steam bath overnight and then let stand at room temperature for a week. The crude material is twice recrystallized from cyclohexane, to yield N - (n-butyl) - 6 - chloro-4-phenyl-2-quinazolinepropionamide, M.P. 114–116° C.

Calcd. for $C_{21}H_{22}ClN_3O$ (percent): C, 68.55; H, 6.03; Cl, 9.64; N, 11.42. Found (percent): C, 68.52; H, 5.73; Cl, 9.6; N, 11.36.

EXAMPLE XVIII

When the procedure of Examples XIV–XVII is repeated, to react an appropriate quinazolinepropionic acid ester with an amine, the following compounds are produced:

N-(2-aminopropyl)-6-methyl-4-phenyl-2-quinazolinepropionamide;
6-bromo-N-[(3-diethylamino)propyl]-4-phenyl-2-quinazolinepropionamide;
N-(2-methylaminoethyl)-4-phenyl-2-quinazolinepropionamide;
N-(2-ethylaminoethyl)-4-(4-tolyl)-2-quinazolinepropionamide;
6-ethoxy-N-(4-propylaminobutyl)-4-(4-tolyl)-2-quinazolinepropionamide;
7-butoxy-4-phenyl-2-quinazolinepropionamide;
N,N-diethyl-4-phenyl-2-quinazolinepropionamide; and
6-chloro-N,N-dimethyl-4-phenyl-2-quinazolinepropionamide.

EXAMPLE XIX

2'-acetyl-3-chloropropionanilide (11.3 g., .05 m.) and potassium cyanide (3.9 g., .06 m.) are suspended in 200 ml. of 95% ethanol and the solution heated to reflux in the presence of a catalytic amount of potassium iodide for one and a half hours. Some insoluble material is filtered off and the ethanol is removed in vacuo. The residue is treated with hot cyclohexane. The cyclohexane solution yields approximately 7.0 g. of ester, which is recrystallized from n-hexane to afford 4-methyl-2-quinazolinepropionic acid, ethyl ester, M.P. 36–37° C.

Calcd. for $C_{14}H_{16}N_2O_2$ (percent): C, 68.75; H, 6.60; N, 11.48. Found: C, 68.61; H, 6.83; N, 11.69.

Similarly, 6-methyl 4-pentyl - 2 - quinazolinepropionic acid, propyl ester is prepared.

EXAMPLE XX

A solution of 48.3 g. (.15 m.) of 2'-benzoyl-3,4'-dichloropropionanilide and 11.7 g. (.18 m.) of potassium cyanide in 300 ml. of dimethoxyethane containing 25 ml. of water is heated to reflux for nine hours. The mixture is allowed to stand at room temperature overnight. Thereafter, the solid is collected, washed wtih water and recrystallized from dimethoxyethane (5.8 g.), to yield 7-chloro-5-hydroxy-5-phenyl - 1,2,3,5 - tetrahydropyrrolo[1,2-a]quinazolin-1-one; M.P. 236–238° C.

Calcd. for $C_{17}H_{13}ClN_2O_2$ (percent): C, 65.20; H, 4.18; Cl, 11.35; N, 8.95. Found (percent): C, 64.91; H, 4.49; Cl, 11.30; N, 8.90.

The above prepared 7-chloro-5-hydroxy-5-phenyl-1,2,3,5-tetrahydropyrrolo[1,2-a]quinazoline-1-one is suspended in a dilute sodium hydroxide solution. The suspension is heated on a steam bath until solution is complete. Subsequently, the solution is cooled and acidified to precipitate 6 - chloro - 4 - phenyl-2-quinazolinepropionic acid, M.P. 163–165° C.

EXAMPLE XXI

Repeating the procedure of Example XX, the following 5 - hydroxytetrahydropyrroloquinazolinone intermediates are prepared and subsequently converted to their corresponding hereinafter listed 2-quinazolinepropionic acids.

| Intermediates | Products |
| --- | --- |
| 5-hydroxy-7-methyl-5-(4-sulfamoylphenyl)-1,2,3,5-tetrahydropyrrolo[1,2-a]quinazolin-1-one. | 6-methyl-4-(4-sulfamoylphenyl)-2-quinazolinepropionic acid. |
| 7-bromo-5-hydroxy-5-phenyl-1,2,3,5-tetrahydropyrrolo[1,2-a]quinazolin-1-one. | 6-bromo-4-phenyl-2-quinazolinepropionic acid. |
| 5-hydroxy-8-methoxy-5-(4-tolyl)-1,2,3,5-tetrahydropyrrolo[1,2-a]quinazolin-1-one. | 7-methoxy-4-(4-tolyl)-2-quinazolinepropionic acid. |
| 7-chloro-5-(4-chlorophenyl)-5-hydroxy-1,2,3,5-tetrahydropyrrolo[1,2-a]quinazolin-1-one. | 6-chloro-4-(4-chlorphenyl)-2-quinazolinepropionic acid. |

EXAMPLE XXII

2'-(2 - chloro-5-sulfamoylbenzoyl) - 2,4' - dichloropropionanilide (2.65 g., .0062 m.) and potassium cyanide (1.20 g., .0185) are heated to reflux in 200 ml. of absolute ethanol overnight. After filtering off inorganic material the filtrate is concentrated in vacuo. The oily residue is dissolved in 50 ml. of 10% sodium hydroxide solution and the solution heated on a steam bath for two hours. Upon cooling and acidification with acetic acid and on standing a yellow solid separates. The collected solid is stirred in 10 ml. of ethanol and the solid collected. When the filtrate is diluted with 50 ml. of benzene more solid is recovered, total yield 1.7 g. The 6-chloro-4-(2-chloro-5-sulfamoylphenyl)-2-quinazolinepropionic acid is isolated and analyzed as a benzene solvate, M.P. 180–90° (dec.).

Analysis.—Calcd. for $C_{17}H_{13}Cl_2N_3O_4S\cdot\frac{1}{3}C_6H_6$ (percent): C, 50.46; H, 3.34; Cl, 15.68; N, 9.29; S, 7.09. Found (percent): C, 50.27; H, 3.38; Cl, 15.82; N, 9.01; S, 6.62.

EXAMPLE XXIII

N-(2-aminoethyl) - 6 - chloro - 4 - phenyl - 2 - quinazolinepropionamide (2.0 g.) is dissolved in benzene (100 ml.). A small amount of insoluble material is filtered off. To the filtrate 10 ml. of acetic anhydride is added and the solution is heated to reflux for two hours. Solid material is collected by concentrating in vacuo and recrystallizing the crude material from dimethoxyethane to yield 1.0 g. of N-(2-acetamidoethyl)-6-chloro-4-phenyl-2-quinazolinepropionamide, M.P. 217–9° C.

Analysis.—Calcd. for $C_{21}H_{21}ClN_4O_2$ (percent): C, 63.54; H, 5.33; Cl, 8.93; N, 14.11. Found: C, 63.94; H, 5.38; Cl, 9.4; N, 14.48.

EXAMPLE XXIV

A solution of 2',5-dichloro-4,5'-disulfamoyl-2-benzoylaniline (12.5 g.; .0294 m.) and 3-chloropropionyl chloride (10 g.; .079 m.) in 150 ml. dioxane is heated to reflux for six hours. The solid material (2.5 g.) is collected. By concentrating the filtrate more solid (12.3 g.) is recovered. The crude material is recrystallized from ethanol to afford 2'-(2-chloro-5-sulfamoylbenzoyl)-3,5'-dichloro-4-sulfamoylpropionanilide, M.P. 170–180° C. (dec.).

A solution of the above prepared 2'-(2-chloro-5-sulfamoylbenzoyl) - 3,5'-dichloro-4-sulfamoylpropionanilide (5.0 g.; .01 m.) and potassium cyanide (1.0 g.; .015 m.) in 200 ml. of absolute ethanol is heated to reflux overnight. After the insoluble material containing 8-chloro-5-(2 - chloro-5-sulfamoyl) - 1,2,3,5 - tetrahydropyrrolo (1,2-a) quinazolin-1-one is removed, the filtrate is concentrated. The residue, 7-chloro-4-(2-chloro-5-sulfamoylphenyl)-6-sulfamoyl-2-quinazolinepropionic acid, ethyl ester, is dissolved in ten percent sodium hydroxide solution, heated on a steam bath for two hours and then cooled. The solution is first extracted with benzene. The alkaline solution is acidified with acetic acid and the gummy solid that separates is recrystallized from water to afford 7-chloro-4-(2-chloro-5-sulfamoylphenyl)-6-sulfamoyl-2-quinazolinepropionic acid.

In the same manner, the following compounds are prepared:

7-bromo-4-(3-sulfamoylphenyl)-6-sulfamoyl-2-quinazolinepropionic acid;
4-(2-bromo-5-sulfamoylphenyl)-7-methyl-6-sulfamoyl-2-quinazolinepropionic acid;
4-(2-iodo-5-sulfamoylphenyl)-8-methoxy-6-sulfamoyl-2-quinazolinepropionic acid; and
7-iodo-4-(3-sulfamoylphenyl)-6-sulfamoyl-2-quinazolinepropionic acid.

What is claimed is:
1. 6-chloro-4-phenyl-2-quinazolinepropionic acid.
2. 6 - chloro-4-(2-chlorophenyl)-2-quinazolinepropionic acid.
3. 4-phenyl-2-quinazolinepropionic acid.
4. 6-chloro-4-phenyl-2-quinazolinepropionic acid, ethyl ester.
5. 6-chloro-4-phenyl-2-quinazolinepropionic acid, methyl ester.
6. 6-chloro-4-phenyl-2-quinazolinepropionic acid, 2-hydroxyethyl ester.
7. 6 - chloro-4-(2-chlorophenyl)-2-quinazolinepropionic acid, ethyl ester.
8. N-(2 - acetamidoethyl)-6-chloro-4-phenyl-2-quinazolinepropionamide.
9. 6-chloro-4-(2-chloro - 5 - sulfamoylphenyl)-2-quinazolinepropionic acid.
10. N-(2-aminoethyl) - 6 - chloro-4-phenyl-2-quinazolinepropionamide.
11. 6-chloro-N-[2-(diethylamino)ethyl - 4 - phenyl-2-quinazolinepropionamide.
12. N-benzyl-6-chloro - 4 - phenyl-2-quinazolinepropionamide.
13. 6-chloro-4-phenyl-2-quinazolinepropionic acid, hydrazide.
14. 6-chloro-N-methyl-4-phenyl - 2 - quinazolinepropionamide.
15. A compound selected from the group consisting of those having the formulae:

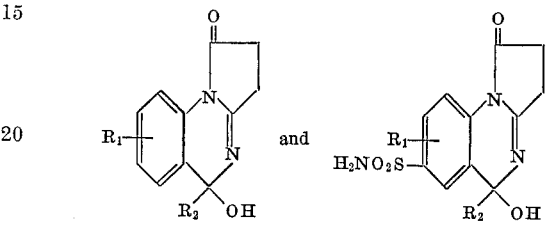

wherein $R_1$ is selected from the group consisting of hydrogen, halogen, lower alkyl and lower alkoxy; and $R_2$ is selected from the group consisting of lower alkyl, phenyl, halophenyl, lower alkylphenyl, lower alkoxyphenyl, sulfamoylphenyl and sulfamoylhalophenyl.

16. A compound as described in claim 15 which is: 7-chloro-5-hydroxy-phenyl - 1,2,3,5 - tetrahydropyrrolo-[1,2-a]quinazolin-1-one.

References Cited

Gabriel: C.A. 6, 1614[3] (1912).

ALEX MAZEL, Primary Examiner

R. V. RUSH, Assistant Examiner

U.S. Cl. X.R.

260—256.4, 256.5, 999